United States Patent [19]

Morhack

[11] 3,814,901

[45] June 4, 1974

[54] STEAM HEATING DEVICE

[75] Inventor: George J. Morhack, Natrona Heights, Pa.

[73] Assignee: Lincoln Manufacturing Company, Inc., Fort Wayne, Ind.

[22] Filed: May 7, 1973

[21] Appl. No.: 358,149

[52] U.S. Cl................. 219/401, 21/95, 99/473, 126/369, 219/362, 219/431, 219/521
[51] Int. Cl............................................. F27d 11/02
[58] Field of Search .......... 219/271, 362, 401, 431, 219/440, 521; 21/94, 95, 98; 99/467, 337, 473; 126/369, 369.1, 20

[56] References Cited
UNITED STATES PATENTS

| | | | |
|---|---|---|---|
| 2,674,935 | 4/1954 | Lewis et al............................. | 99/473 |
| 2,719,211 | 9/1955 | Lewis et al............................. | 219/401 X |
| 2,973,705 | 3/1961 | Klemm.................................... | 99/337 |
| 2,980,099 | 4/1961 | Klemm.................................... | 126/20 |
| 3,500,818 | 3/1970 | Elias....................................... | 126/369 |
| 3,604,895 | 9/1971 | MacKay.................................. | 219/401 |
| 3,732,396 | 5/1973 | Tucker.................................... | 219/401 |

*Primary Examiner*—Volodymyr Y. Mayewsky
*Attorney, Agent, or Firm*—Albert L. Jeffers; Roger M. Rickert

[57] ABSTRACT

A steam heating device in which a compartment is provided closed on the top by a tiltable cover or lid. A member forming the lower side of the compartment has apertures therein and a steam generating means is provided underneath the member forming the lower side of the compartment for the supply of steam through the apertures thereof into the compartment to heat foodstuffs and the like that are placed in the compartment and enclosed by lowering the lid or cover thereover.

12 Claims, 6 Drawing Figures

PATENTED JUN 4 1974

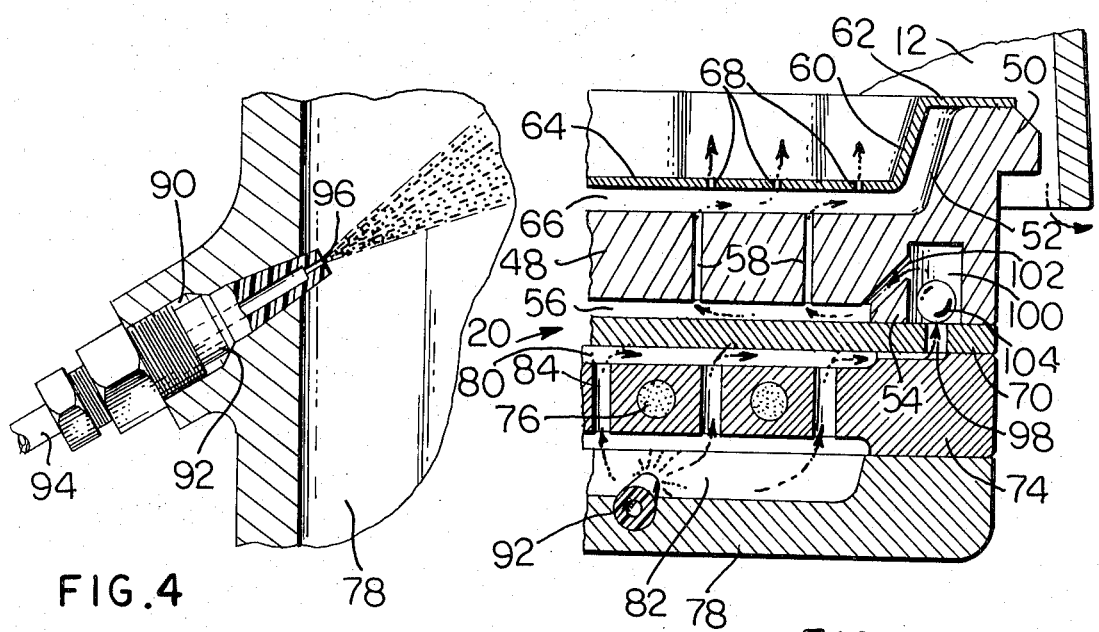
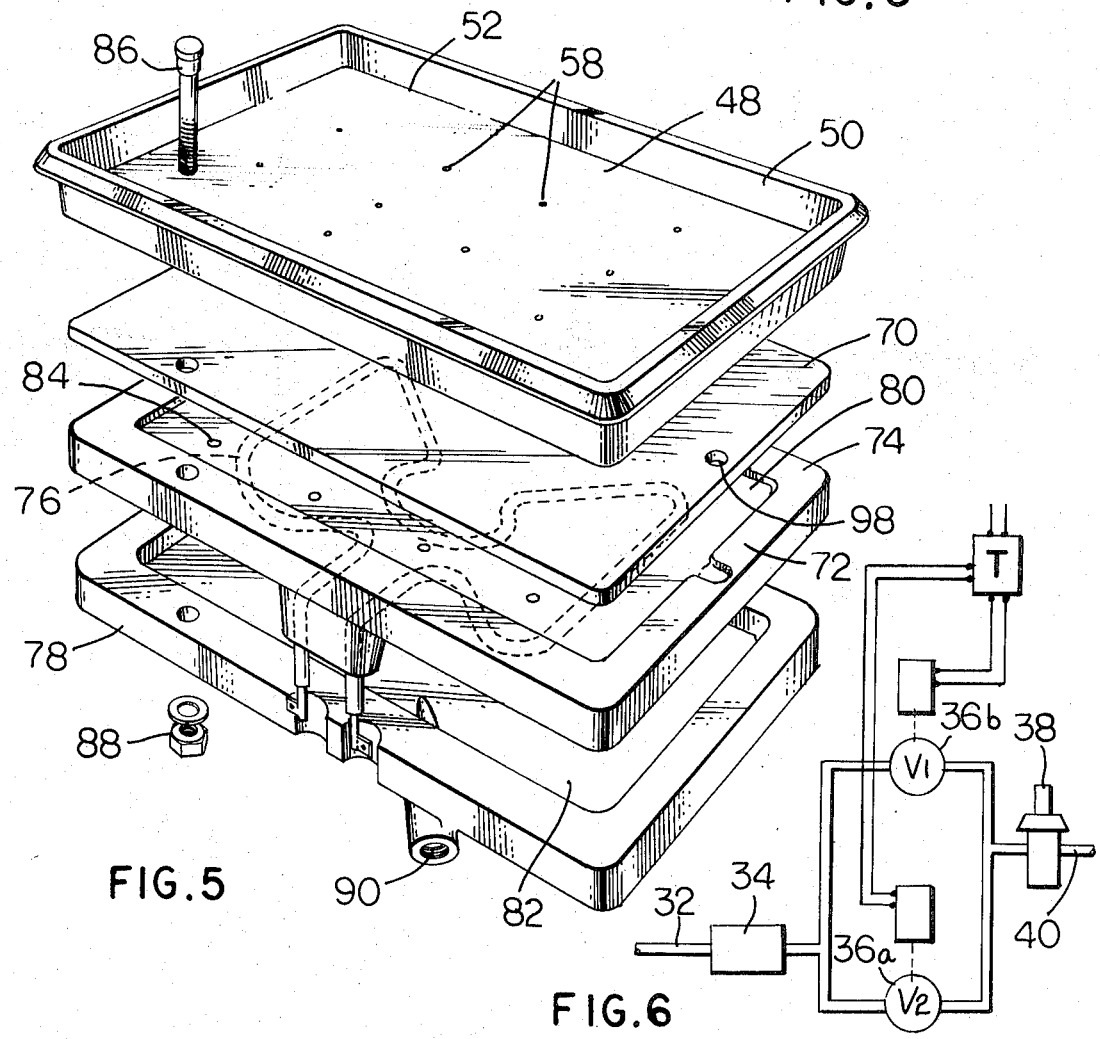

STEAM HEATING DEVICE

The present invention relates to a steam heating device and in particular to a device of this nature which is employed for heating foodstuffs, especially precooked foodstuffs which may be refrigerated or frozen.

The heating of refrigerated or frozen foodstuffs, or even canned foodstuffs, is important, especially in connection with restaurants, because the heating of the foodstuffs must be carried out rapidly and efficiently.

Devices are known which have compartments with tiltable lids into which the foodstuffs are placed with steam being generated and supplied to the compartment in which the foodstuff is located.

Heretofore, some difficulties have been encountered in connection with the depositing of solids in the steam generating region underneath the lower member of the compartment and some difficulty has also been encountered in respect of supplying ample steam to the compartment and for maintaining the supply of steam substantially constant.

The steam is generated by injecting water into a heated region and it is important that the injection of the water be carried out in such a manner that the steam generating region is not overly cooled by the injected water.

Still further, the injection of the steam into the steam generating region is accomplished by forcing the water through a nozzle which breaks up the water as it enters the steam generating region and this nozzle quite naturally becomes hot, at least at the discharge end, between intervals of water injection and can tend to accumulate deposits.

With the foregoing in mind, a primary objective of the present invention is the provision of a steam heating device of the nature referred to which overcomes the objections referred to above.

A still further object of the present invention is the provision of a steam heating device in which the accumulation of deposits in the steam generating region is substantially reduced over what has occurred heretofore.

A still further object of the present invention is the provision of a nozzle arrangement through which water is injected into the steam generating region of the device in which the nozzle is so constructed and arranged that deposits do not form thereon.

It is also an object of the present invention to provide a steam heating device, especially for heating foodstuffs, in which the water is supplied to a steam generating region in the device in controlled amounts at predetermined regular intervals.

These and other objects and advantages of the present invention will become more apparent upon reference to the following detailed specification taken in connection with the accompanying drawings in which:

FIG. 3 is a fragmentary view indicated by line III—III on FIG. 1 and drawn at enlarged scale.

FIG. 4 is a fragmentary perspective view showing more in detail the nozzle through which water is injected into the steam generating region of the device.

FIG. 5 is an exploded perspective view showing the lower member of the compartment and the parts of the steam generator which are connected to the underside thereof.

FIG. 6 schematically shows a modification.

BRIEF SUMMARY OF THE INVENTION

According to the present invention, a frame is provided having in the upper portion thereof a somewhat pan shaped lower member which forms the lower side of a compartment. Hinged to the upper side of the frame is a lid or cover which can be closed down over the aforementioned member to form a compartment for receiving foodstuff to be heated.

Connected to the underside of the aforementioned lower member is an electrically heated steam generator and a supply conduit with a timer controlled valve is provided for injecting water into the steam generator which immediately converts to steam which is also superheated in the generator. The aforementioned lower member forming the bottom of the compartment is perforated and the steam passes upwardly through the perforations in the member and into the compartment whereby foodstuff placed in the compartment can be brought rapidly up to the proper temperature.

A control valve between the steam generator and the compartment permits one way flow only of the steam. The water is injected into the steam generator in measured amounts so as not to cool the steam generator to the point that the steam generated thereby is wet.

There is preferably a perforated pan resting on top of the lower member forming the bottom of the compartment and which can easily be removed for cleaning and sanitizing.

DETAILED DESCRIPTION OF THE INVENTION

Figure 1:
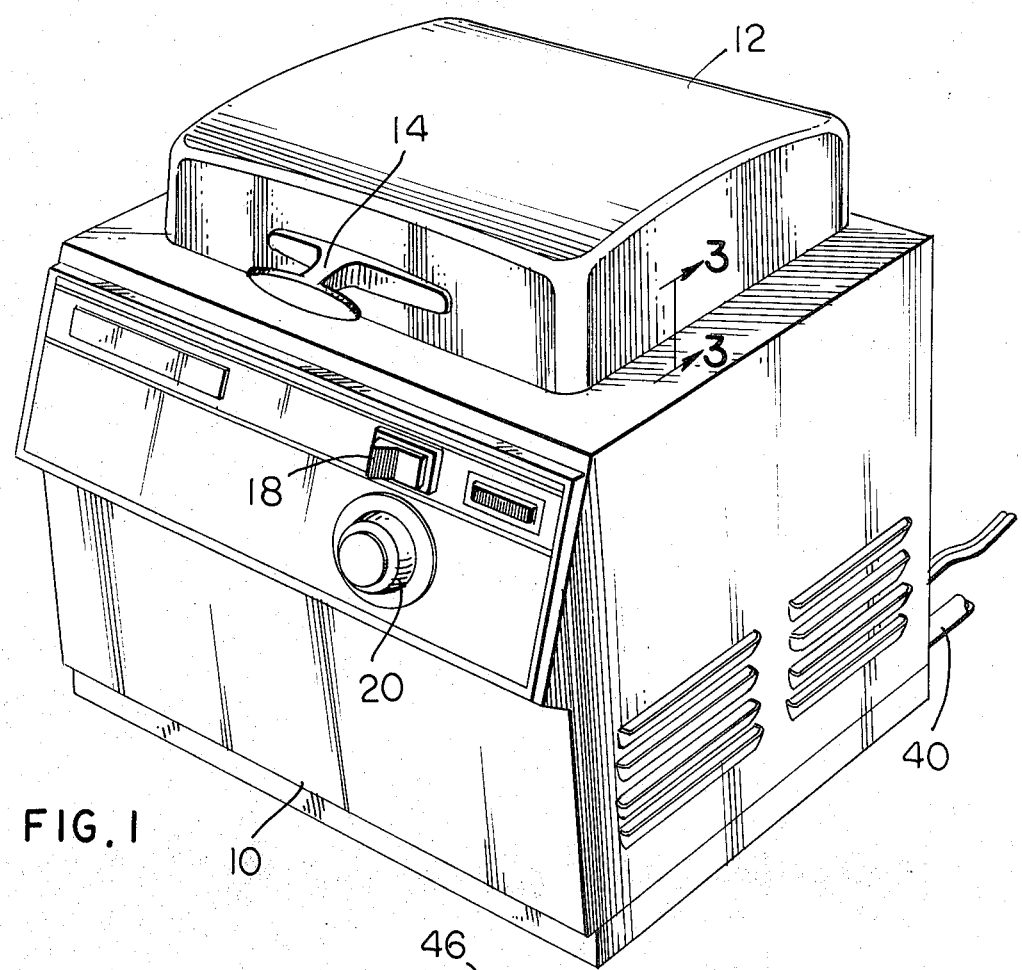
FIG. 1 is a perspective view of a steam heating device constructed according to the present invention.

Referring to the drawings somewhat more in detail, in FIG. 1, 10 is the base portion, or frame, of a steam heating device according to the present invention while 12 represents a lid or cover mounted on the top thereof and pivotal upwardly and backwardly by availing of a handle 14. As will be seen in FIG. 2, lid or cover 12 is supported by hinge means 16 at the back.

The frame 10 may include controls, for example, an ON-OFF switch 18 and a timer adjusting knob 20. The timer adjusting knob determines the length of time that the steam generator in the device is heated and also controls the supply of water to the steam generator.

Figure 2:
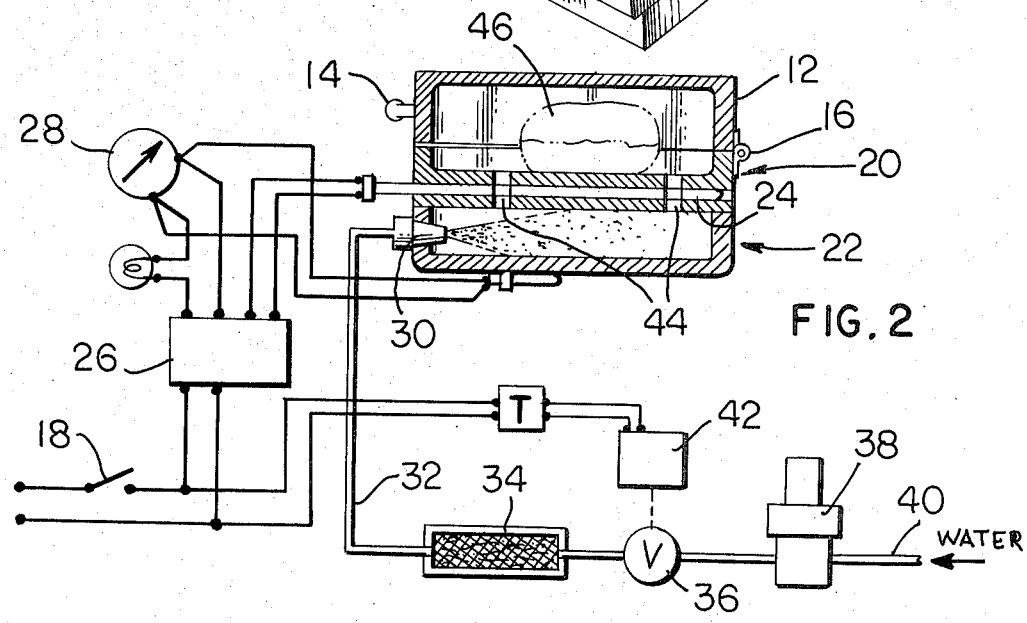
FIG. 2 is a diagrammatic showing of the device in cross section and showing the connection thereto of a water supply and also shows the connection thereto of an electric heater circuit and an electric control circuit.

As is schematically illustrated in FIG. 2, there is carried in frame 10, beneath lid or cover 12, a lower portion for the compartment generally indicated at 20 and therebeneath is disposed a steam generator, generally indicated at 22. The steam generator is provided with electric heating means 24 connected in circuit with a controller 26 and rheostat 28.

A nozzle 30 is provided for injecting water into the compartment in steam generator 22 and nozzle 30 is supplied with water via a conduit 32 connected to the discharge end of a water conditioner or filter 34, the inlet end of which is connected through a valve 36 with the discharge side of a pressure regulator 38, the inlet side of which is connected to the water mains by a conduit 40.

Valve 36 is adapted for being operated into open position by energization of a solenoid 42 so that a supply of water through valve 36 to nozzle 30 can be placed under the control of an electric timer connected in controlling relation to solenoid 42.

The filter, or water conditioner, 36 may be any of several types, but it is preferred to use a conditioner of the type illustrated in U.S. Pat. No. 3,680,705, and which shows a unit in which the water is caused to flow through strong magnetic fields which appears to be effective for preventing calcareous deposits from forming in the steam generator when the water is heated.

The steam generated in the steam generator rises upwardly through aperture means generally indicated at 44 in FIG. 2 so as to enter the compartment in which foodstuffs 46 is disposed. According to the present invention, it is insured that the steam rising through the apertures will be dry steam, preferably superheated to a degree that will substantially prevent condensation of the steam in the foodstuff containing compartment.

The construction of the device according to the present invention is illustrated more in detail in FIGS. 3, 4 and 5. In FIG. 3, the portion generally indicated at 20 in FIG. 2 will be seen to comprise a plate-like cast member 48, referred to as a "food tray" and having an upstanding peripheral rim 50 with a recess 52 defined inwardly of rim 50. The underneath side of member 48 has a dependent peripheral rim portion 54 and inwardly thereof is a large chamber or space 56. Space 56 communicates with a recess 52 via apertures 58 extending through plate 48 in laterally and longitudinally distributed relation.

Advantageously, a relatively thin pan element 60 is provided having a horizontal flange 62 about the upper edge which rests on top of rim part 50 of member 48 and having a perforated bottom wall 64. Bottom wall 64 serves as the bottom of the foodstuff receiving compartment and the entire pan element 60 is removable for cleaning purposes.

Between the bottom of the pan element 60 and the upwardly facing bottom wall of recess 52 there is a space 66 serving as steam distributing means so that steam will be uniformly supplied to the apertures 68 distributed over the bottom wall 64 of pan element 60.

A flat horizontal baffle plate 70 is provided which abuts the bottom of the dependent rim part 54 of flat member 48 and which is sealed thereto. Abutting the bottom side of baffle plate 70 is the rim part 72 of a heater plate 74 which is provided with electric heating means 76 distributed therein.

Finally, engaging the bottom side of heater plate 74 is a heater cover, or bottom closure or cover plate 78. Between the top of heater plate 74 and baffle plate 70 there is defined a chamber 80 and between the bottom of heater plate 74 and the top of bottom cover plate 78 there is defined a chamber 82. Holes 84 distributed over heater plate 74 interconnect spaces 80 and 82.

As will be seen in FIG. 5, bolt means 86 are provided which downwardly pass through plates 48, 70, 74, and 78 and at the bottom engage nut means. Bolt means fixedly and firmly clamp members 48, 70, 74 and 78 together with sealing means being provided to seal the interengaging surfaces of the plates together.

Bottom cover plate 78 is provided with aperture means 90 in about the middle of one side edge, as will be seen in FIGS. 3, 4 and 5, adapted for receiving a nozzle 92 to which is connected to a water supply conduit 94. It will be noted to that nozzle 92 is so disposed that water is supplied thereto will flow out through the orifice 96 at the discharge end of the nozzle and be broken up into small particles and directed against the bottom of heater plate 74 in the region of about the middle thereof.

The water will immediately be vaporized by the hot heater plate and will rise upwardly through holes 84 in the form of steam and will then flow from space 80 upwardly through a hole 98 provided in baffle plate 70 and into a downwardly opening recess 100 formed in plate member 48. The steam then flows through an inclined passage 102 into space 56. A ball 104 in recess 100 cooperates with the upper end of hole 98 to form a one way check valve so that steam can only flow upwardly into recess 100.

The steam in passing upwardly through holes 84 and along the top of heater plate 74 in chamber 80 becomes superheated so that the steam supplied to space 56 is not only dry but preferably has a substantial amount of superheat imparted thereto. This steam will rise through holes 58 of plate member 48 into chamber 66 and will be distributed over the bottom of plate 60 and will rise upwardly through the apertures 68 therein into the food compartment. Any overpressure developed in the foodstuff compartment is relieved by the flow of gases outwardly under the edge of lid or cover 12.

The supply of water into the steam generator is controlled by controlling valve 36 and one way of accomplishing this is to provide a timer T connected in controlling relation to solenoid 46 with timer T being, in turn, under the control of ON-OFF switch 18 so as to operate whenever switch 18 is in its closed position.

The nozzle 92 is advantageously formed, not of metal, as has previously been the practice, but of a material which will withstand the temperatures encountered and which will tend to inhibit the deposit of solids thereon. For example, it has been found that the material sold under the trade name of TEFLON and which consists of polytetrafluroethylene. This material will withstand the heat to which it is subjected, which is estimated to be about 300° Fahrenheit maximum.

The timer T is so arranged that advantageously solenoid 42 is pulsed about every 15 seconds and on each pulse released about 7 cubic centimeters of water are supplied to nozzle 92 and injected into the steam generator.

It has also been found that two valves 36 placed in parallel, and individually controlled, so that first one is pulsed and then the other is pulsed at the beginning of each time period of, say, 15 seconds, permits the supply of more water into the steam generator without cooling the heater plate so much that the steam received in the food compartment is not prefectly dry.

It is, thus, contemplated to employ two valves in place of one valve 36 and to pulse the two valves sequentially in order to increase the supply of water to the steam generator. FIG. 6 shows such a modification in which the same reference numerals, where applicable, are employed as in FIG. 2. In FIG. 6, however, valves 36a and 36b are in parallel and the respective solenoids 42a and 42b are controlled by timer T so as to open sequentially. The valves can be identical and open for identical times, or the valves can be arranged to open for different times and provide for injection of respective amounts of water into the steam generator. Alternatively, a single valve could be pulsed open repetitively at the beginning of each time period to provide for an increased supply of water so delivered to the steam generator as to prevent excessive cooling thereof.

What is claimed is:

1. A steam heating device for heating foodstuff; a frame, a horizontal first plate in the top of the frame and a cover pivotally mounted on top of the frame, said first plate and cover forming therebetween a compartment for receiving foodstuff to be heated, a heater plate beneath said first plate and having electrically insulated electric heating means therein, a cover plate beneath the heater plate, means securing said plates together in peripherally sealed relation, first chamber means formed between said cover plate and heater plate, second chamber means formed between said heater plate and said first plate, holes in said heater plate leading from said first chamber means to said second chamber means and holes in said first plate leading from said second chamber means to said compartment, nozzle means mounted in said cover plate for the introduction of water into said first chamber means, a conduit having one end connected to said nozzle means and at the other end adapted for connection to a source of water under pressure, normally closed valve means in said conduit, and electrically operated control means operable automatically for periodically actuating said valve means into open position for a predetermined period of time.

2. The device according to claim 1 in which means is provided for supplying electrical energy to said control means during the period of energization of said electric heating means.

3. The device according to claim 1 which includes filter means in said conduit through which the water passes operable to treat the water to reduce the solids precipitated therefrom when the water is heated.

4. The device according to claim 1 in which said nozzle means is formed of a nonmetallic material.

5. The device according to claim 4 in which said material is selected from the class of fluorocarbons which includes polytetrafluoroethylene.

6. The device according to claim 1 which includes a baffle plate clamped between the bottom of said first plate and the top of said heater plate and dividing said second chamber means into upper and lower chamber portions, and check valve means interconnecting said chamber portions and opening toward the upper one thereof.

7. The device according to claim 6 in which said baffle plate has a hole near one edge thereof, a downwardly opening recess in said first plate into which said hole opens at the top, a passage from said recess to said upper chamber portion, and a ball in said recess engageable with the upper end of said hole.

8. The device according to claim 1 in which the upper side of said first plate is recessed, and a tray having a peripheral flange engaging the top of said first plate around said recess and having a perforated bottom wall parallel to the upwardly facing bottom wall of said recess.

9. The device according to claim 1 which includes solenoid means energizable for opening said valve means, said control means including time controlled means operable to effect energization of said solenoid means at periodic intervals.

10. The device according to claim 1 in which said nozzle means is directed angularly upwardly toward the bottom of said heater plate and comprises a small outlet opening whereby water supplied to said conduit by said nozzle means is broken up into droplets and impinges directly on said heater plate.

11. The device according to claim 1 which includes filter means in said conduit through which the water passes operable to treat the water to reduce the solids precipitated therefrom when the water is heated, said filter means comprising magnetic field means through which the water flows, said nozzle means being formed of a nonmetallic material.

12. The device according to claim 1 which includes filter means in said conduit through which the water passes operable to treat the water to reduce the solids precipitated therefrom when the water is heated, said filter means comprising magnetic field means through which the water flows, said nozzle means being formed of polytetrafluoroethylene.

* * * * *